United States Patent Office 3,417,109
Patented Dec. 17, 1968

3,417,109
PREPARATION OF MONO-TERPENOID PRODUCTS
Govindan Velayudhan Nair and Gopalkrishna Dattaram Pandit, Bandra, Bombay, India, assignors to Lever Brothers Company, New York, N.Y., a corporation
No Drawing. Filed May 23, 1966, Ser. No. 551,898
Claims priority, application Great Britain, May 24, 1965, 21,805/65
9 Claims. (Cl. 260—347.8)

ABSTRACT OF THE DISCLOSURE

The specification discloses the preparation of linalool oxide by contacting a 2,3-epoxy ester of a 2,6-dimethyl-octadien-8-ol with an acid catalyst in the presence of an inert solvent at a temperature between 0° C. and the reflux temperature of the solvent.

This invention relates to a method for synthetically preparing linalool oxide.

Linalool oxide has been isolated in small yield from a wide variety of natural products and shown to have an extremely pleasant perfume. It has been blended with a number of other chemical compounds to prepare a wide range of perfumery products. Owing to the demand for linalool oxide thus created much experimental research has been carried out in an effort to find an economic and efficient method for its preparation. Due to the labile character of the intermediates involved this has, up to now, provided a very difficult problem.

The invention provides a process for preparation of linalool oxide as herein defined which comprises reacting the 2,3-epoxy acylate of a 2,6-dimethyl-octadien-8-ol with an acid catalyst in an inert solvent. In this specification and claims references to linalool oxide are to be taken as references to the mixture of the cis and trans isomeric 2-methyl-2-vinyl-5-hydroxyisopropyl-tetrahydrofuran which represents the product known as linalool oxide in the literature.

The process of this invention enables linalool oxide of high purity to be prepared in comparatively high yield. 2,3-epoxy 2,6-dimethyl-oct-6-en-8-yl acylates are readily prepared by methods described in such references as Bull. Soc. Chim. France (1963), pages 376–378, and E. Klein and W. Rojahn, Dragaco Report 3 (1964), 51. An example of one such method is set out herein as follows.

19.5 g. pure geranyl acetate was added dropwise to a well stirred and cooled solution (0° C.) of 21 g. monoperphthalic acid in 250 ml. ether. The mixture was further stirred for an hour at 10° C, and left overnight in the refrigerator. Next day, the precipitated phthalic acid was removed by filtration. The ether solution was washed with an aqueous solution of sodium bicarbonate and then an aqueous sodium thiosulphate solution followed by water. The ether solution was then dried over anhydrous magnesium sulphate and was distilled under vacuum after removal of the solvent. The epoxy acylate obtained was 2,3-epoxy geranyl acetate (14.5 g.), B.P. 100–102° C./1.5 mm. (GLC showed only a single peak).

2,3-epoxy neryl acetate can also be prepared by this method and is suitable for conversion to linalool oxide by the process of the present invention. Nerol and geraniol are isomeric 2,6-dimethyl-2,6-octadien-8-ols.

Although the acetates of nerol and geraniol have been used as the most readily available esters this reaction can be also carried out if the formate, propionate, butyrate, benzoate or phenyl acetate ester of nerol or geraniol is used. For the sake of convenience in this specification the benzoate and phenyl acetate groups are regarded as acylate groups.

Mixing of the epoxy acylate compounds with the acid catalyst may be brought about by a number of different methods. Two preferred methods are exemplified as:

(1) Dissolving the epoxy acylate compound in an inert solvent, stirring and optionally cooling the solution thus obtained and adding the acid catalyst while the temperature is maintained between 0° C. and 25° C.

(2) Dripping the epoxy acylate compound into a stirred combination of acid catalyst and solvent while the temperature is maintained between 0° C. and 25° C.

The temperature of the reaction mixture may be varied from 0° C. to the refluxing temperature of the solvent. For maximum yields the temperature of the reaction mixture, after the addition of acid catalyst, should be maintained between 25 and 30° C.

The time of the reaction may vary from 3 to 60 hours, preferably being about 40 hours. For reaction periods as short as 3 hours it is necessary to reflux the solutions containing the epoxy acylate compound and acid catalyst. The yield of linalool oxide obtained by this method is not as high as with other conditions although plant utilisation is improved.

Suitable acid catalysts include sulphuric, hydrochloric, phosphoric or p-toluene sulphonic acids. The concentration of the acid catalyst in the reaction solution varies from 0.5 to 50% w./v.

The preferred catalyst is sulphuric acid which may be used either in a form diluted with water or diluted with organic solvent. The concentration of the sulphuric acid which is to be added to the reactant solution may vary from 5 to 100% although it is preferred to use a 60% w./v. solution. The yield and purity of the linalool oxide obtained is greatly affected by the concentration of the acid catalyst.

Sulphuric, hydrochloric or ortho-phosphoric acid are preferably employed as acid catalysts in this reaction in solvents of a polar type. Acetone, methanol and ethanol are preferred solvents. p-Toluene sulphonic acid is best employed in a nonpolar solvent such as chloroform or an aromatic hydrocarbon solvent for example benzene or toluene.

After reacting the 2,3-epoxy 2,6-dimethyl oct-6-en-8-yl acylate with the acid, linalool oxide is recovered by the standard methods of dilution of the reaction mixture with water or saturated saline, ether extraction, washing and drying the ether extract over magnesium sulphate, evaporation of the ether and vacuum distillation of the residue.

The yield of linalool oxide produced in this manner can be as high as 75% (of theoretical). Pure "linalool oxide" has a refractive index at 20° C. of 1.4510 an optical activity $[\alpha]_D$ of $-0.93°$ and a boiling range of 60–80° C./8 mm.

As has already been stated linalool oxide is essentially a mixture of cis and trans 2-methyl-2-vinyl-5-hydroxyisopropyl tetrahydrofuran. These isomers are shown as two major peaks in gas chromatographic analysis. The cis isomer has a retention time of 5.75 minutes and the trans isomer a retention time of 6.50 minutes.

The furano compounds may be separated by a chromatographic procedure involving the use of alumina. The mixture is successively eluted with dry (40–60°) petroleum ether containing increasing amounts of benzene and finally pure benzene. The pure cis-isomer is extracted by (40–60°) petroleum ether containing 10% v./v. benzene. It has an optical activity $[\alpha]_D^{20}$ of $-9.7°$ and a refractive index at 20° C. of 1.4490. The trans isomer could not be isolated in a completely pure form by this method.

The process of the invention is illustrated by the following examples.

EXAMPLE I (a) To a well stirred solution of 10 g. of 2,3-epoxy geranyl acetate in 50 ml. of acetone kept at a temperature between 0° C. and 25° C. was added 10 ml. of 60% w./v. aqueous sulphuric acid. This reaction mixture was set aside overnight. Next day the reaction mixture was diluted with 200 ml. of a saturated aqueous solution of sodium chloride and ether extracted twice (each time with 150 ml.). The ether extracts were combined, washed free of acid with aqueous sodium bicarbonate solution and dried over anhydrous magnesium sulphate. Ether was then evaporated and the residue distilled under vacuo.

Yield 4.7 g., B.P. 60–75/6 mm. (59.75% of theoretical).

(b) In a further similar experiment the reaction mixture was left for 40 hours before working up as in the manner hereinabove described.

Yield 5.9 g., B.P. 60–75° C./6 mm. (75% of theoretical).

EXAMPLE II

To a well stirred solution of 14 g. 2,3-epoxy geranyl acetate in 75 ml. of acetone was added 25 ml. of 29% w./v. sulphuric acid, maintaining the temperature of the reaction mixture at 25° C. This mixture was set aside for two days at room temperature (25° C.). At the end of this period, part of the acetone was removed by evaporation in vacuo. The residue was poured into water and ether extracted. The ether extract was washed free from acid with aqueous sodium bicarbonate solution and dried over anhydrous magnesium sulphate. Ether was then evaporated and the residue distilled under vacuo. The purity of the linalool oxide produced by this method was estimated at 90% by a GLC method.

Yield 5 g., B.P. 60–80°/9 mm. (41.5% of theoretical).

EXAMPLE III

The above experiment was repeated with 14 g. of 2,3-epoxy geranyl acetate dissolved in 50 ml. acetone and 20 ml. 29% w./v. sulphuric acid. The mixture was kept only for 18 hours at room temperature (25° C.). The linalool oxide was isolated by the method described in Example II. The purity of the linalool oxide was estimated at 95% by GLC.

Yield 3.8 g., B.P. 60–80°/9 mm. (31.5% of theoretical).

EXAMPLE IV 10 g. of 2,3-epoxy geranyl acetate was added to a solution of 50 ml. of 5% w./v. methanolic sulphuric acid cooled to a temperature of about 0° C. The reaction mixture was stirred for three hours at room temperature (25° C.) and then set aside in the refrigerator overnight. Next day the reaction product was diluted with 200 ml. water and the methanol removed in a rotary evaporator. The residue was ether extracted twice (each time with 150 ml. ether). The combined ether layer was washed free from acid with aqueous sodium bicarbonate solution and dried over anhydrous magnesium sulphate. Ether was then removed and the residue distilled under vacuo.

Yield 1.7 g., B.P. 60–80°/8 mm. (22% of theoretical).

EXAMPLE V 900 mg. p-toluene sulphonic acid was added to a solution of 10 g. of 2,3-epoxy geranyl acetate in 100 ml. of benzene kept at room temperature. The reaction mixture was set aside overnight at room temperature. The benzene solution was then washed free of acid with aqueous sodium bicarbonate solution, dried over anhydrous magnesium sulphate and distilled.

Yield 1.5 g., B.P. 60–80°/8 mm. (18.75% of theoretical).

EXAMPLE VI 10 g. of 2,3-epoxy geranyl acetate was dissolved in 50 ml. of acetone and the solution kept at a temperature of 0–10° C. 50 ml. phosphoric acid (80%) were dropwise added with vigorous stirring. The mixture was left overnight at room temperature and worked up by dilution with water and ether extraction as described in previous examples.

Yield 2.5 g., B.P. 60–85°/8 mm. (31% of theoretical).

EXAMPLE VII 4.5 g. of 2,3-epoxy geranyl acetate was mixed with 25 ml. of 60% w./v. sulphuric acid at room temperature 25° C. and kept well stirred for 24 hours. At the end of this period the mixture was poured into ice cold water and extracted with ether. The ether layer was then washed free of acid with aqueous sodium bicarbonate solution, dried over anhydrous magnesium sulphate and distilled. The distillate, B.P. 70–85° C./8–9 mm., weighed 1.5 g. (45% of theoretical). On analysis (by GLC) the distillate was found to be a mixture of at least eight compounds including linalool oxide. In order to obtain a pure product it therefore appears necessary that a solvent for the reactants be used.

Table I illustrates further similar experiments. The general pattern of working out was the same as in examples described above.

TABLE I

| Exp. | Reactant | Solvent | Acid catalyst | Time and temp. | Remarks |
| --- | --- | --- | --- | --- | --- |
| 1 | 400 mg. 2,3-epoxy neryl acetate | 10 ml. acetone | 2 ml. 60% w./v. $H_2SO_4$ | 20 hrs. room temp. | Linalool oxides formed were detected in GLC. |
| 2 | 4 g. 2,3-epoxy geranyl formate | 20 ml. acetone | 8 ml. 60% w./v. $H_2SO_4$ | do | 1.5 g. linalool oxides 90% pure by GLC. |
| 3 | 1 g. 2,3-epoxy geranyl acetate | 10 ml. acetone | 5 ml. 1% w./v. $H_2SO_4$ | do | No linalool oxide. |
| 4 | do | do | 2.5 ml. 2.5% w./v. $H_2SO_4$ | do | Trace amounts of linalool oxide detected in GLC. |
| 5 | do | do | 1.5 ml. 80% w./v. $H_2SO_4$ | do | Linalool oxide a major product. |
| 6 | do | do | 1.5 ml. 90% w./v. $H_2SO_4$ | do | Do. |
| 7 | do | do | 1 ml. 70% w./v. $H_2SO_4$ | do | Do. |
| 8 | 1 g. 2,3-epoxy geranyl butyrate | do | 1.5 ml. 60% w./v. $H_2SO_4$ | do | Linalool oxide in GLC. |
| 9 | 10 g. 2,3-epoxy geranyl acetate | 75 ml. acetone | 15 ml. 29% w./v. $H_2SO_4$ | 3 hrs. refluxing temperature. | 1.5 g. linalool oxide distilled 90% pure by GLC. |
| 10 | do | 100 ml. benzene | 600 mg. p-toluene sulphonic acid. | do | 1.5 g. linalool oxide. |
| 11 | 12 g. 2,3-epoxy geranyl acetate | 75 ml. acetone | 25 ml. 29% w./v. $H_2SO_4$ | 40 hours room temp. | 4.5 g. of 90% pure linalool oxide on GLC. |
| 12 | 5 g. 2,3-epoxy geranyl acetote | 50 ml. methanol | 2.5 ml. 98% w./v. $H_2SO_4$ | 20 hours room temp. | Linalool oxide is major product on distillate. |
| 13 | 10 g. 2,3-epoxy geranyl acetate | 50 ml. acetone | 10 ml. 60% w./v. $H_2SO_4$ | 40 hours room temp. | 5.9 g of distillate 90% pure linalool oxide (approx.). |
| 14 | do | do | 10 ml. 60% w./v. $H_2SO_4$ | 60 hours room temp. | 5.7 g. of 90% pure linalool oxide (approx.). |
| 15 | do | do | 10 ml. 20% HCl sol | 40 hours room temp. | 5 g. of distillate contained about 30% linalool oxide. |
| 16 | do | do | 10 ml. 60% w./v. $H_2SO_4$ | Refluxed for 3 hours on water bath. | 5.5 g. of distillate of 90% pure linalool oxide. |

It may be noted from this table (Experiments 3 and 4) that when sulphuric acid of concentration less than 5% w./v. is used as the acid catalyst then the yield of linalool oxide is negligible.

What is claimed is:

1. A process for the preparation of linalool oxide which comprises contacting a solution of an epoxy acylate selected from the group consisting of 2,3-epoxy geranyl formate, 2,3-epoxy neryl formate, 2,3-epoxy geranyl acetate, 2,3-epoxy neryl acetate, 2,3-epoxy geranyl propionate, 2,3-epoxy neryl propionate, 2,3-epoxy geranyl butyrate, 2,3-epoxy neryl butyrate, 2,3-epoxy geranyl benzoate, 2,3-epoxy neryl benzoate, 2,3-epoxy geranyl phenyl acetate and 2,3-epoxy neryl phenyl acetate in an inert solvent with a catalyst acid selected from the group consisting of hydrochloric acid, phosphoric acid, sulphuric acid and p-toluene sulphonic acid.

2. A process according to claim 1 in which the reaction is carried out at a temperature between 0° C. and the refluxing temperature of the reaction mixture.

3. A process according to claim 2 in which the concentration of acid in the reaction mixture is between 0.5 and 50% w./v.

4. The process of claim 3 wherein the temperature of the reaction mixture comprising an epoxy acylate, an acid catalyst, and an inert solvent, is maintained between 25° C. and 30° C.

5. The process of claim 2 wherein the inert solvent is a polar solvent and the acid catalyst is selected from the group consisting of hydrochloric acid, sulphuric acid, and o-phosphoric acid.

6. The process of claim 5 wherein the polar solvent is selected from the group consisting of methanol, ethanol and acetone.

7. The process of claim 5 wherein the inert solvent is water, and the catalyst acid is sulphuric acid at a concentration of from 0.5 to 50%, weight to volume.

8. The process of claim 1 wherein the acid is present at a concentration of 60%, weight to volume, and the reaction temperature is maintained between 25° C. and 30° C., after addition of the catalyst.

9. The process of claim 1 wherein the inert solvent is selected from the group consisting of chloroform and aromatic hydrocarbons and the acid catalyst is p-toluene sulphonic acid.

References Cited

UNITED STATES PATENTS 3,184,480   5/1965   McConnell et al. ___ 260—347.8

OTHER REFERENCES

Ohloff et al.: Chem. Abstracts, vol. 60, col. 13275(h) (1964).

NICHOLAS S. RIZZO, Primary Examiner.

B. I. DENTZ, Assistant Examiner.